UNITED STATES PATENT OFFICE.

CHARLES J. BABB, OF BROOKLYN, NEW YORK.

COMPOSITION OF MATTER.

1,370,263.   Specification of Letters Patent.   Patented Mar. 1, 1921.

No Drawing.   Application filed April 1, 1920. Serial No. 370,513.

*To all whom it may concern:*

Be it known that I, CHARLES J. BABB, a citizen of the United States, residing at Brooklyn, in the county of Kings and State of New York, have invented certain new and useful Improvements in Composition of Matter, of which the following is a specification.

This invention has relation to a composition of matter and has for an object to provide means for preventing the deterioration of pine oil or disinfectants containing pine oil so that the germicidal power of the pine oil will not become impaired through age or for other causes.

I have discovered that disinfectants containing pine oil as the chief germicidal agent become greatly weakened in the course of a few months after manufacture. The property of the pine oil or disinfectant containing the same to kill germs and bacteria will become greatly lessened, even after the composition is bottled, and especially if it is exposed to light. This deterioration is due to a gradual chemical change in the pine oil and the change is one of oxidation. Pine oil as referred to in this patent is a general term given to certain fractions from the terpentine distillation of waste wood of the long leaf southern pine but is understood to mean any "pine oil" from any pine by this or similar processes. Pine oil is probably a mixture of many essential oils of the terpineol family but the essential constituent is alpha terpineol and is probably the optically active lævo modification of a terpineol. Terpineol is an unsaturated alcohol and being unsaturated oxidizes readily, terpineol peroxid being one compound formed by its oxidation. Pine oil ranges in density from .9291 to .9583 at 15.5 C., acid value 0.17 to 0.73, iodin value 118.4 to 173.9, flash 145° to 176° F. Average analysis—carbon 79.00%, hydrogen 11.2%, oxygen 9.8%. Pure terpineol analysis— carbon 77.85%, hydrogen 11.77%, oxygen 10.38%.

A soluble pine oil disinfectant is any disinfectant which is soluble in water or produces when poured into water a subdivision of the oil such as is characteristic of emulsions as to be considered soluble in water and containing "pine oil" in all proportions and manufactured by the "steam or solvent" process, emulsified with saponified rosin, saponified fatty acids or any other emulsifying agent that would render the "pine oil" soluble in water as described above. I have discovered that there is a slow, accumulative oxidation of the pine oil with the formation of oxidation products of no or lesser germicidal power than pure pine oil, thus causing a weakening of the germicidal power of the disinfectant. Pine oil is capable of dissolving large quantities of oxygen. The action in the presence of water is therefore of dual character, the atmospheric oxygen simultaneously producing peroxid of hydrogen which dissolves in the water and oxidizes the pine oil yielding oxidation products such as terpineol peroxid, camphor resins, etc. This shows clearly why the disinfectant weakens much more rapidly than the pure pine oil alone.

The use of any reducing agent in any proportion at any time during the preparation of the disinfectant to prevent this oxidation, and subsequent germicidal weakening especially, the use of any reducing sugar, added at any time during the preparation, and in all proportions, namely, grape sugar, or dextrose designated d-glucose by Fischer and known in its commercial form as starch sugar; also levulose, maltose or malt sugar, lactose, or milk sugar, invert sugar, etc. While any compound or mixture containing reducing sugars such as glucose, honey, etc., or any of the reducing sugars named may be used, I prefer to use what is known commercially as grape sugar, and of this I employ about one-half of one per cent. by weight of the disinfectant or pine oil to be treated. It is also possible to prevent weakening of a pine oil disinfectant by the use of other reducing agents such as hydrogen, carbon monoxid, sulfur dioxid, and the sulfites, phosphites, hypophosphites, and the ferrous salts of iron, tin, chromium and the like, in any proportions. These reducing agents may be added to the pine oil or disinfectant in any stage of its manufacture, and hence I do not wish to limit myself in any manner to the process of incorporating the reducing agent therein, nor do I wish to limit myself in the use of any specific reducing agent, but what I claim is:

1. A composition of matter containing reducing sugar and pine oil made by the fractional steam distillation of pine wood.

2. A composition of matter containing pine oil and a reducing sugar.

3. A composition of matter containing pine oil and an invert sugar.

4. A composition of matter containing pine oil and grape sugar.

5. A disinfectant containing pine oil and grape sugar in the proportion of one-half of one per cent. of the grape sugar by weight to ninety-nine and one-half per cent. of the disinfectant.

In testimony whereof I affix my signature.

CHARLES J. BABB.